US011276413B2

(12) United States Patent
Lee et al.

(10) Patent No.: US 11,276,413 B2
(45) Date of Patent: Mar. 15, 2022

(54) AUDIO SIGNAL ENCODING METHOD AND AUDIO SIGNAL DECODING METHOD, AND ENCODER AND DECODER PERFORMING THE SAME

(71) Applicants: Electronics and Telecommunications Research Institute, Daejeon (KR); THE TRUSTEES OF INDIANA UNIVERSITY, Indianapolis, IN (US)

(72) Inventors: Mi Suk Lee, Daejeon (KR); Jongmo Sung, Daejeon (KR); Minje Kim, Bloomington, IN (US); Kai Zhen, Bloomington, IN (US)

(73) Assignees: Electronics and Telecommunications Research Institute, Daejeon (KR); THE TRUSTEES OF INDIANA UNIVERSITY, Indianapolis, IN (US)

( * ) Notice: Subject to any disclaimer, the term of this patent is extended or adjusted under 35 U.S.C. 154(b) by 41 days.

(21) Appl. No.: 16/543,095

(22) Filed: Aug. 16, 2019

(65) Prior Publication Data

US 2020/0135220 A1 Apr. 30, 2020

Related U.S. Application Data

(60) Provisional application No. 62/751,105, filed on Oct. 26, 2018.

(30) Foreign Application Priority Data

Feb. 26, 2019 (KR) ........................ 10-2019-0022612

(51) Int. Cl.
*G10L 15/00* (2013.01)
*G10L 19/16* (2013.01)

(52) U.S. Cl.
CPC .................................. *G10L 19/167* (2013.01)

(58) Field of Classification Search
CPC ...... G10L 19/02; G10L 19/0018; G10L 15/00
See application file for complete search history.

(56) References Cited

U.S. PATENT DOCUMENTS

| | | | | |
|---|---|---|---|---|
| 8,484,022 | B1 * | 7/2013 | Vanhoucke | G10L 19/0018 704/240 |
| 8,959,015 | B2 | 2/2015 | Lee et al. | |
| 9,830,920 | B2 | 11/2017 | Rose et al. | |
| 10,397,725 | B1 * | 8/2019 | Bharitkar | H04R 5/02 |
| 10,706,856 | B1 * | 7/2020 | Korjani | G10L 19/02 |

(Continued)

OTHER PUBLICATIONS

Deng et al., "Deep Convex Net: A Scalable Architecture for Speech Pattern Classification"; Aug. 28-31, 2011, Microsoft Reasearch, pp. 2285-2288 (Year: 2011).*

(Continued)

*Primary Examiner* — Shreyans A Patel
(74) *Attorney, Agent, or Firm* — William Park & Associates Ltd.

(57) ABSTRACT

Disclosed are an audio signal encoding method and audio signal decoding method, and an encoder and decoder performing the same. The audio signal encoding method includes applying an audio signal to a training model including N autoencoders provided in a cascade structure, encoding an output result derived through the training model, and generating a bitstream with respect to the audio signal based on the encoded output result.

12 Claims, 6 Drawing Sheets

(56) References Cited

U.S. PATENT DOCUMENTS

| | | | | |
|---|---|---|---|---|
| 2012/0275609 | A1 | 11/2012 | Beack et al. | |
| 2016/0189730 | A1* | 6/2016 | Du | G10L 21/0272 704/233 |
| 2017/0076224 | A1* | 3/2017 | Munawar | G06N 3/084 |
| 2019/0164052 | A1* | 5/2019 | Sung | G06N 3/088 |
| 2019/0198036 | A1* | 6/2019 | Osako | G06N 3/0454 |
| 2020/0090029 | A1* | 3/2020 | Suzuki | G06N 3/04 |
| 2020/0168208 | A1* | 5/2020 | Mitra | G10L 15/075 |

OTHER PUBLICATIONS

Kaiming He et al., "Deep Residual Learning for Image Recognition", 2016 IEEE Conference on Computer Vision and Pattern Recognition (CVPR), Jun. 27-30, 2016, 770-778, IEEE, Las Vegas, NV, USA.

* cited by examiner

AUDIO SIGNAL ENCODING METHOD AND AUDIO SIGNAL DECODING METHOD, AND ENCODER AND DECODER PERFORMING THE SAME

CROSS-REFERENCE TO RELATED APPLICATION(S)

This application claims the priority benefit of U.S. Provisional Application No. 62/751,105 filed on Oct. 26, 2018 in the U.S. Patent and Trademark Office, and Korean Patent Application No. 10-2019-0022612 filed on Feb. 26, 2019 in the Korean Intellectual Property Office, the disclosures of which are incorporated herein by reference for all purposes.

BACKGROUND

1. Field of the Invention

One or more example embodiments relate to an audio signal encoding method and audio signal decoding method, and an encoder and decoder performing the same, and more particularly, to an encoding method and decoding method that applies a result of learning using autoencoders provided in a cascade structure.

2. Description of the Related Art

Recently, machine learning has been applied to various fields, and such attempts are also considered in a field of audio signal processing. A machine learning model such as a deep neural network (DNN) may improve the efficiency of coding audio signals.

In particular, an autoencoder which is a network minimizing an error between an input signal and an output signal is widely used to code audio signals. However, to further improve the coding efficiency in the scheme of coding audio signal using such an autoencoder, a flexible network structure is needed.

SUMMARY

An aspect provides a method that may code high-quality audio signals by connecting autoencoders in a cascade manner and modeling a residual signal, not modeled by a previous autoencoder, in a subsequent autoencoder.

According to an aspect, there is provided an audio signal encoding method including applying an audio signal to a training model including N autoencoders provided in a cascade structure, encoding an output result derived through the training model, and generating a bitstream with respect to the audio signal based on the encoded output result.

The training model may be derived by connecting the N autoencoders in a cascade form, and training a subsequent autoencoder using a residual signal not learned by a previous autoencoder.

The training model may be derived by iteratively updating autoencoders provided in a cascade form through M update rounds.

The training model may be a model that an error of an N-th autoencoder is back propagated respectively to a first autoencoder through an (N−1)-th autoencoder.

The training model may a model that respective errors of the N autoencoders are back propagated from respective decoder regions to encoder regions.

According to an aspect, there is provided an audio signal decoding method including restoring a code layer parameter from a bitstream, applying the restored code layer parameter to a training model including N autoencoders provided in a cascade structure, and restoring an audio signal before encoding through the training model.

The training model may be derived by connecting the N autoencoders in a cascade form, and training a subsequent autoencoder using a residual signal not learned by a previous autoencoder.

The training model may be derived by iteratively updating autoencoders provided in a cascade form through M update rounds.

The training model may be a model that an error of an N-th autoencoder is back propagated respectively to a first autoencoder through an (N−1)-th autoencoder.

The training model may be a model that respective errors of the N autoencoders are back propagated from decoder regions to encoder regions.

According to an aspect, there is provided an audio signal encoder including a processor configured to apply an audio signal to a training model including N autoencoders provided in a cascade structure, encode an output result derived through the training model, and generate a bitstream with respect to the audio signal based on the encoded output result.

The training model may be derived by connecting the N autoencoders in a cascade form, and training a subsequent autoencoder using a residual signal not learned by a previous autoencoder.

The training model may be derived by iteratively updating autoencoders provided in a cascade form through M update rounds.

The training model may be a model that an error of an N-th autoencoder is back propagated respectively to a first autoencoder through an (N−1)-th autoencoder.

The training model may be a model that respective errors of the N autoencoders are back propagated from decoder regions to encoder regions.

According to an aspect, there is provided an audio signal decoder including a processor configured to restore a code layer parameter from a bitstream, apply the restored code layer parameter to a training model including N autoencoders provided in a cascade structure, and restore an audio signal before encoding through the training model.

The training model may be derived by connecting the N autoencoders in a cascade form, and training a subsequent autoencoder using a residual signal not learned by a previous autoencoder.

The training model may be derived by iteratively updating autoencoders provided in a cascade form through M update rounds.

The training model may be a model that an error of an N-th autoencoder is back propagated respectively to a first autoencoder through an (N−1)-th autoencoder.

The training model may be a model that respective errors of the N autoencoders are back propagated from decoder regions to encoder regions.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
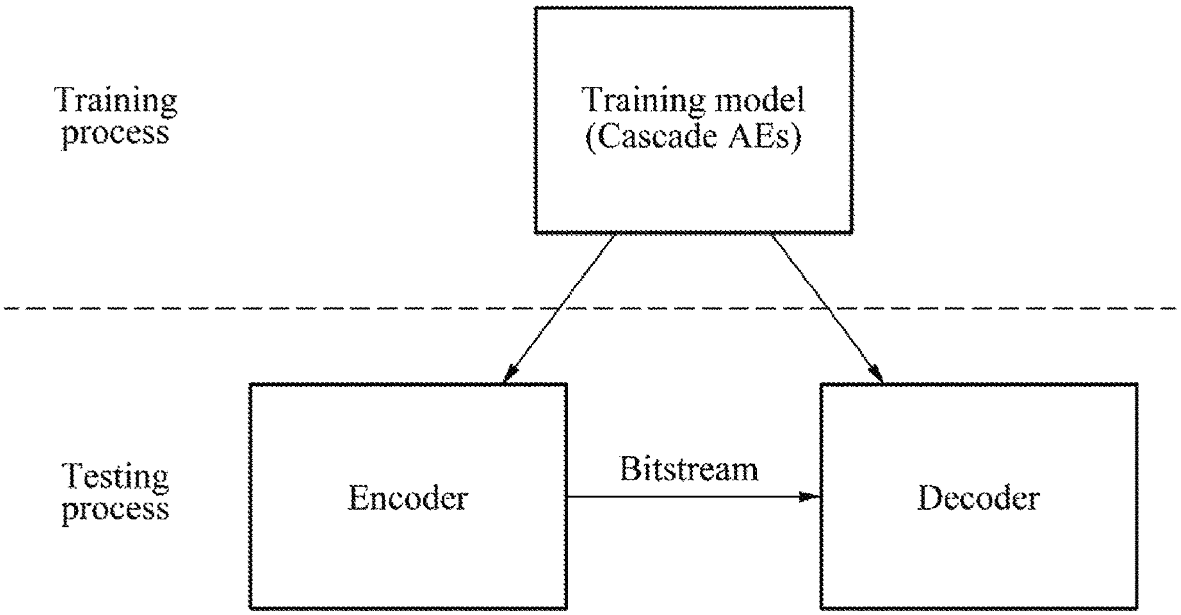
FIG. 1 is a diagram illustrating an encoder and a decoder according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

FIG. 1 is a diagram illustrating an encoder and a decoder according to an example embodiment.

Example embodiments are classified into a training process and a testing process, and a process of applying an encoding method and a decoding method in practice corresponds to the testing process. In this example, a training model trained in the training process is used for an encoding process and a decoding process corresponding to the testing process. Herein, the training model includes autoencoders provided in a cascade structure such that the autoencoders are connected in a cascade manner, and information (residual signal/residual information) not modeled by a previous autoencoder is modeled by a subsequent autoencoder.

The encoding method and the decoding method described herein refers to an encoding part and a decoding part constituting an autoencoder. However, the whole encoding system integrally uses encoding parts of multiple autoencoders, and the same applied to decoding parts thereof. That is, the encoding method and the decoding method refer to audio signal coding, and an autoencoder includes an encoding part which generates a code layer parameter with respect to an input signal through a plurality of layers, and a decoding part which restores an audio signal from the code layer parameter through the plurality of layers again.

Example embodiments propose training autoencoders constituting a cascade structure, and training a plurality of autoencoders connected in a cascade manner. A training model trained in that manner may be utilized to encode or decode audio signals input in a testing process.

Figure 2:
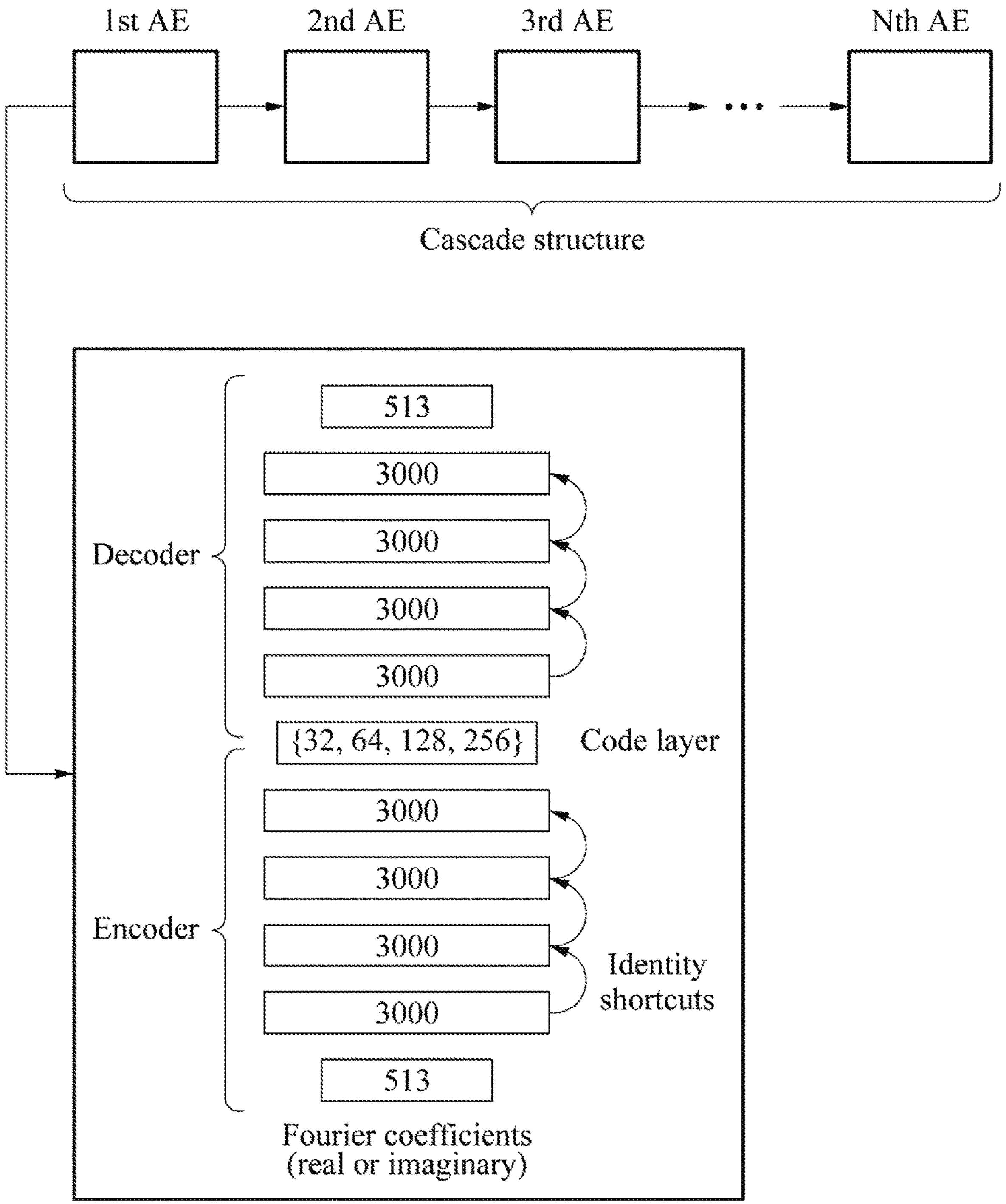
FIG. 2 is a diagram illustrating a training model according to an example embodiment.

FIG. 2 is a diagram illustrating a training model according to an example embodiment.

FIG. 2 illustrates a plurality of autoencoders configured in a cascade structure. Here, the cascade structure refers to a structure in which an output derived from an autoencoder of a predetermined stage is used as an input of an autoencoder of a subsequent stage. FIG. 2 proposes a training model in which N autoencoders are connected in a cascade manner.

The autoencoders each include a residual network ResNet divided into an encoder p art, a decoder part, and a code layer. The autoencoders each have identity shortcuts defining a relationship between hidden layers.

The autoencoders of FIG. 2 may be expressed by Equation 1.

$$x(n+1) \leftarrow \sigma F(x(n);W(n))+x(n)) \quad \text{[Equation 1]}$$

In Equation 1, n denotes an order of a hidden layer, and x(n) denotes a variable input into an n-th hidden layer. Further, W(n) denotes parameters of the n-th hidden layer, and σ denotes a nonlinearity. Instead of learning a nonlinear mapping relationship between the input x(n) and a target x(n+1) using an autoencoder, the training process may be reconstructed by adding the input as a reference contribution to the output.

The autoencoders of FIG. 2 include residual networks ResNet, which is very effective for audio signal coding. This shows a baseline network architecture which is a fully connected network. The fully connected network with a feedforward routine may be expressed by Equation 2 using a bias b.

$$x(n+1) \leftarrow \sigma(W(n)x(n)+b(n))+x(n) \quad \text{[Equation 2]}$$

As shown in FIG. 2, an autoencoder in a baseline form is divided into an encoder part and a decoder part. The encoder part receives a frequency representation of an audio signal as an input, and generates a binary code as an output of a code layer. Further, the binary code is used as an input of the decoder part, to restore the original spectrum.

A step function is used to convert the output of the code layer into a bitstream, and a sign function as expressed by Equation 3 may be used as an example of the step function.

$$h \leftarrow \mathrm{sign}(W(5)\times(5)+b(5)) \quad \text{[Equation 3]}$$

In Equation 3, h denotes the bitstream. An identity shortcut indicates a relationship between hidden layers of the encoder part and the decoder part. The number of hidden units in the code layer is used to determine a bit rate since the number of bits per frame corresponds to the number of hidden units. The autoencoders may receive a spectrum in which audio signals are represented in a form of frequency, for example, modified discrete cosine transform (MDCT) or short time Fourier transform (STFT), as an input signal. The autoencoders are trained on both a real region and an imaginary region of the spectrum.

Figure 3:
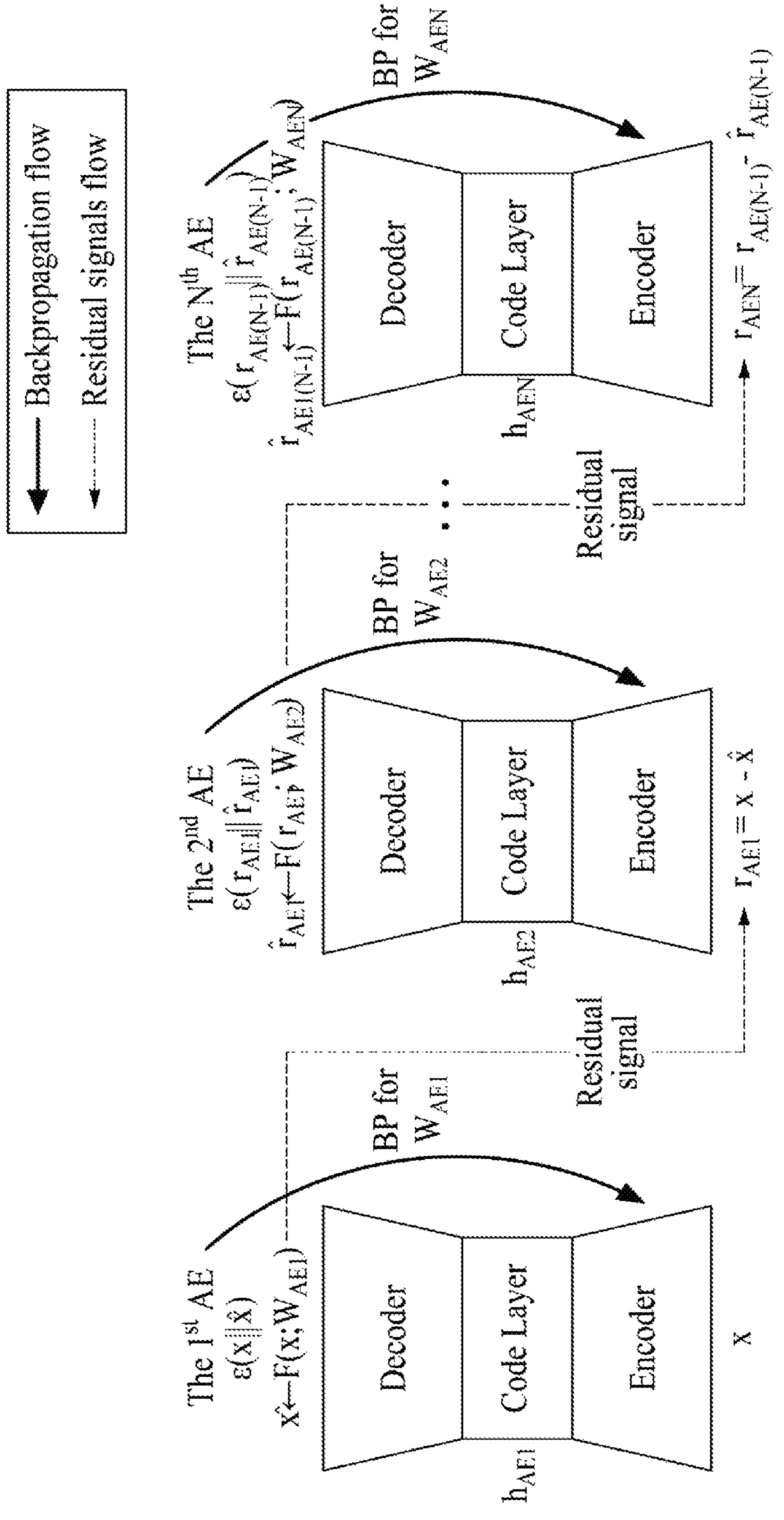
FIG. 3 is a diagram illustrating autoencoders provided in a cascade structure according to an example embodiment.

FIG. 3 is a diagram illustrating autoencoders provided in a cascade structure according to an example embodiment.

FIG. 3 illustrates an inter-model residual signal learning process in autoencoders provided in a cascade structure. A code $h_{AE}$ generated by an encoder part of an autoencoder is input into a decoder to generate a predicted input spectrum. $F(x;W_{AE})$ represents the entire autoencoding process parametrized by $W_{AE}$. The inter-model residual signal learning may add an autoencoder to improve the performance. First, an AE1 generates $h_{AE1}$ and a first residual signal $r_{AE1}=x-\hat{x}$, and uses this as an input of a second autoencoder. The second autoencoder AE2 generates $r_{AE1\text{[<]BEGINITALm}}$ along with $h_{AE2}$. By continuously adding autoencoders in this manner, a residual signal of a previous autoencoder may be approximated.

In the example FIG. 3, a residual signal of an autoencoder is transferred to another autoencoder. In FIG. 3, with respect to an input signal x provided in relation to the encoding process, the encoder is programmed to run all the N autoencoders in a sequential order. Then, bitstreams $h_{AE1}$ to $h_{AEN}$ generated from all the autoencoders area all transferred to a Huffman coding module, which will generate a final bitstream.

When the bitstream is input into the decoder in relation to the decoding process in FIG. 3, signals are restored through $F_{Dec}(x; W_{AEn})\forall n$. The restored signals are added up to approximate an initial input signal using a total error. FIG. 3 illustrates a flow of back propagation to minimize an error of an individual autoencoder with respect to a predetermined parameter set $W_{AEn}$ of the autoencoder, and a flow of inter-model residual signal.

Figure 4:
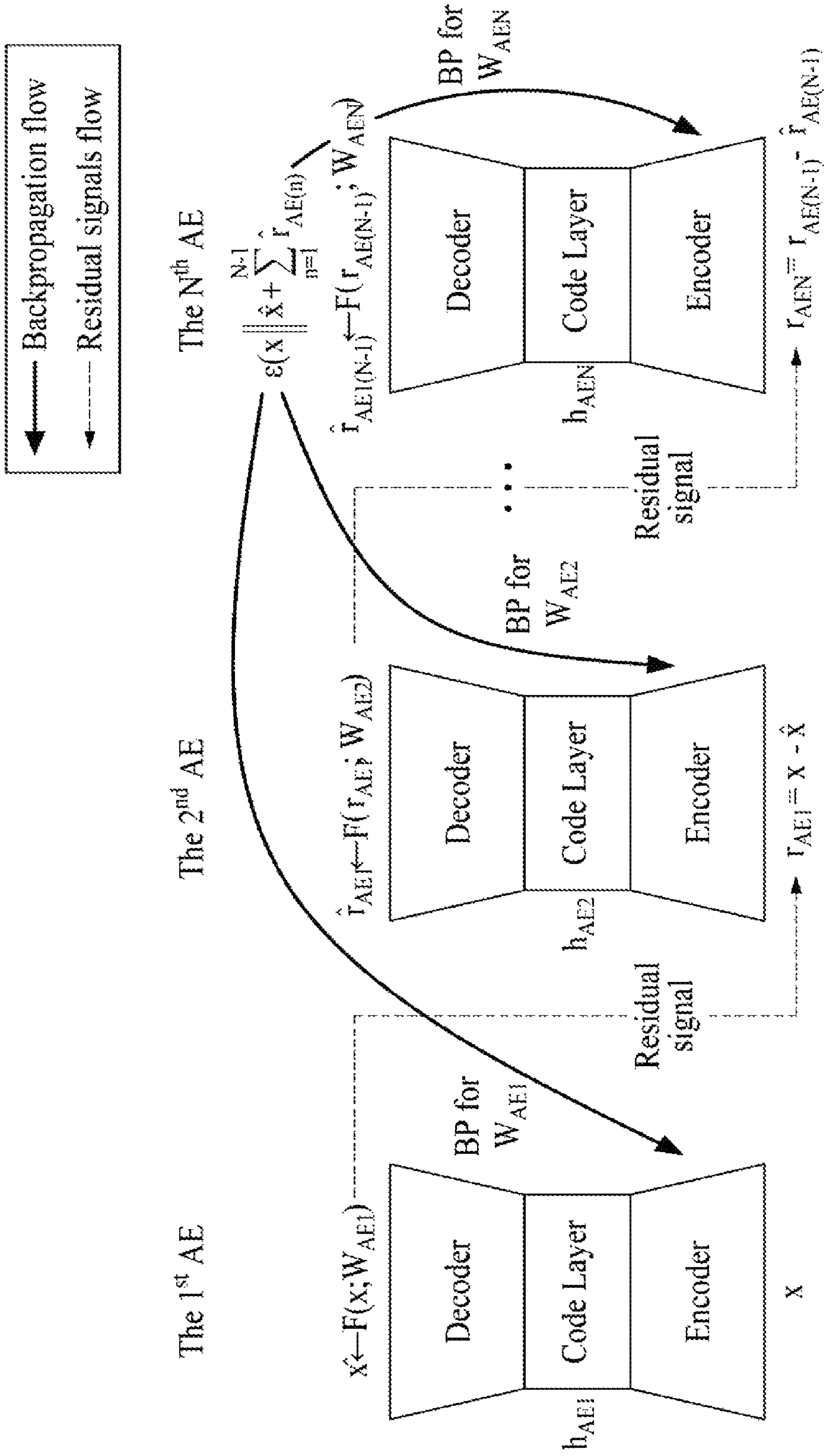
FIG. 4 is a diagram illustrating autoencoders provided in a cascade structure according to an example embodiment.

FIG. 4 is a diagram illustrating autoencoders provided in a cascade structure according to an example embodiment.

The codec mentioned in FIG. 3 is difficult to train even when an advanced optimization technique is used. We use a "greedy training" scheme to train each baseline model in a first round for an initialization of a training model, and finetuning all training models at the same time in a second round. In a first greedy training process, each autoencoder is trained to minimize an error $\varepsilon(r_{AEn}\|\hat{r_{AEn}})$.

In the greedy training, a divide-and-conquer manner is applied to optimize each autoencoder more easily. The downside of this approach is that there is no guarantee that the individual autoencoders are the best solution to minimize a global error of best approximation. For example, a sub-optimal training of an autoencoder in the middle may result in an unnecessary burden for success, and then eventually degrade the total coding performance.

To alleviate an issue caused by the greedy training, an additional finetuning process may be performed in addition to the greedy training. For this, a process of obtaining parameters through greedy training is regarded as a pre-training process, and the parameters obtained through this are used to initialize parameters for the finetuning process which is a secondary training process. For the performance improvement, the finetuning process is performed as follows. First, parameters of the autoencoders are initialized with parameters pre-trained in the greedy training operation. Feedforward is performed on all the autoencoders sequentially to calculate the total approximation error. Then, when the error is back propagated to update all the autoencoders at the same time, an integrated total approximation error is used, instead of an approximation error of a residual signal that may be set separately for each autoencoder. Through this, it may be expected to correct an unsatisfactory training result of a predetermined autoencoder that may result from the greedy training process to mitigate the total approximation error.

A cascaded inter-model residual learning system may use linear predictive coding (LPC) as preprocessing. An LPC residual signal e(t) may be used as expressed by Equation 4.

$$S(t) = \sum_{k=1}^{r} a_k s(t-p) + e(t) \qquad \text{[Equation 4]}$$

In Equation 4, $a_k$ denotes a k-th LPC coefficient. An input of the auto encoder AE1 may be a spectrum of e(t).

According to an example embodiment, an acoustic model based weighting model may be used. Further, various network compression techniques may be used to reduce the complexity of the encoding process and the decoding process. As an example, parameters may be encoded based on a quantity of bits, as in a bitwise neural network (BNN).

Figure 5:
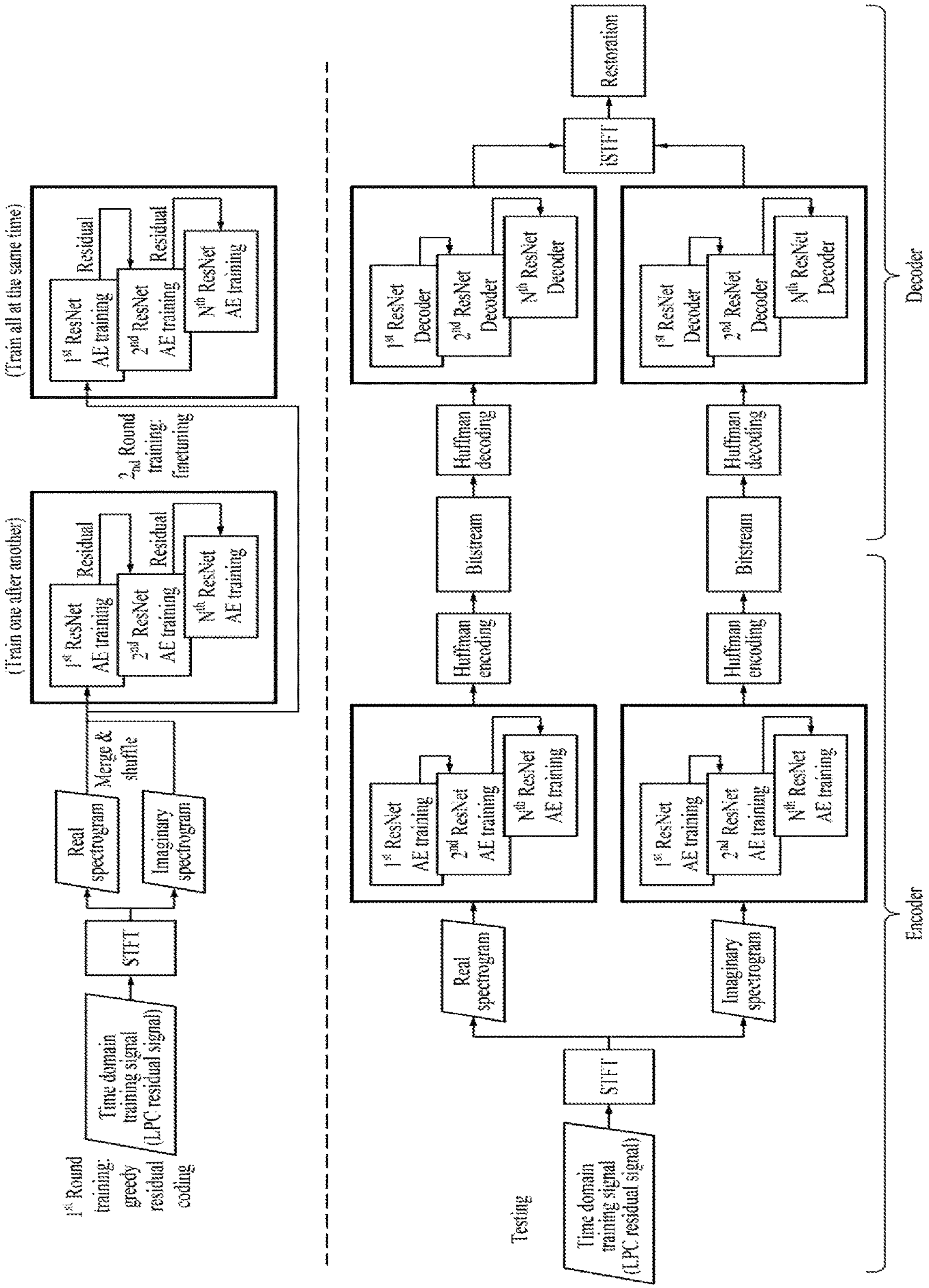
FIG. 5 is a diagram illustrating an encoder and a decoder based on short-time Fourier transform (STFT) according to an example embodiment.

FIG. 5 is a diagram illustrating an encoder and a decoder based on STFT according to an example embodiment.

In FIG. 5, a processing is performed separately on top and bottom. The top relates to a training process for residual signal coding performed a number of times, and the bottom relates to a decoding process using a training result.

On the top, when an LPC residual signal being a time domain training signal is input, STFT is performed. Then, depending on a result of performing STFT, a real spectrogram and an imaginary spectrogram are generated. The real spectrogram and the imaginary spectrogram are merged, shuffled, and then trained through N ResNET autoencoder trainers. This training process may be continuously iterated.

On the bottom, when STFT is performed on an LPC residual signal being a time domain training signal to be tested, a real spectrogram and an imaginary spectrogram are generated. Then, when the real spectrogram and the imaginary spectrogram are processed through N ResNET autoencoder trainers and a Huffman encoding is performed thereon, bitstreams with respect to the real spectrogram and the imaginary spectrogram are generated. This is a processing of an encoder.

When running through the N ResNET autoencoder trainers and performing inverse STFT after a Huffman decoding is performed on the bitstreams with respect to the real spectrum and the imaginary spectrum, the LPC residual signal being the original time domain training signal is restored. This is a processing of a decoder.

Figure 6:
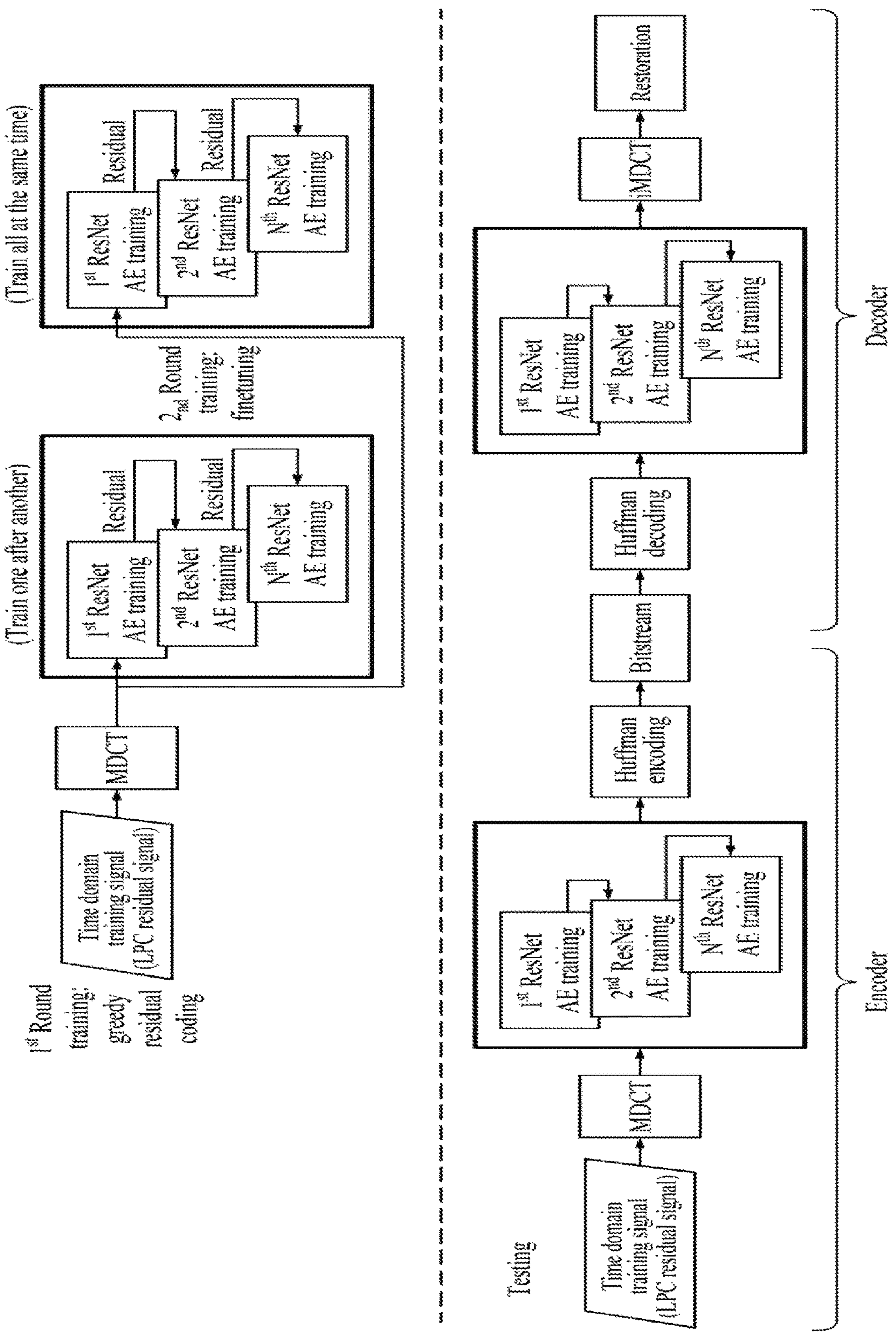
FIG. 6 is a diagram illustrating an encoder and a decoder based on modified discrete cosine transform (MDCT) according to an example embodiment.

FIG. 6 is a diagram illustrating an encoder and a decoder based on MDCT according to an example embodiment.

In FIG. 6, a processing is performed separately on top and bottom. The top relates to a training process for residual signal coding performed a number of times, and the bottom relates to a decoding process using a training result.

On the top, when an LPC residual signal being a time domain training signal is input, MDCT is performed. Then, a result of performing MDCT is trained through N ResNET autoencoder trainers. Such a training process may be continuously iterated.

On the bottom, MDCT is performed on an LPC residual signal being a time domain training signal to be tested. When a Huffman encoding is performed after a result of performing MDCT is processed through N ResNET autoencoder trainers, bitstreams are generated. This is a processing of an encoder.

When running through the N ResNET autoencoder trainers and performing inverse MDCT after a Huffman decoding is performed on the bitstreams, the LPC residual signal being the original time domain training signal is restored. This is a processing of a decoder.

According to example embodiments, it is possible to model a residual signal (information) not modeled by a previous autoencoder, in a subsequent autoencoder by adopting autoencoders provided in a cascade structure using a machine learning based audio coding scheme.

According to example embodiments, it is possible to encode or decode audio signals more effectively by adopting autoencoders provided in a cascade structure, and to control a bit rate depending on a network situation through an extensible structure.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An audio signal encoding method, comprising:

applying an audio signal to a training model including N autoencoders provided in a cascade structure such that the N autoencoders are each connected in series;

encoding an output result derived through the training model; and generating a bitstream with respect to the audio signal based on the encoded output result, wherein the training model is derived by connecting the N autoencoders in a cascade form, and training a subsequent autoencoder using a residual signal not learned by a previous autoencoder, wherein a residual signal of the previous autoencoder is an input of the subsequent autoencoder.

2. The audio signal encoding method of claim 1, wherein the training model is derived by iteratively updating autoencoders provided in a cascade form through M update rounds.

3. The audio signal encoding method of claim 1, wherein the training model is a model that an error of an N-th autoencoder is back propagated respectively to a first autoencoder through an (N−1)-th autoencoder.

4. The audio signal encoding method of claim 1, wherein the training model is a model that respective errors of the N autoencoders are back propagated from respective decoder regions to encoder regions.

5. An audio signal decoding method, comprising:

restoring a code layer parameter from a bitstream;

applying the restored code layer parameter to a training model including N autoencoders provided in a cascade structure such that the N autoencoders are each connected in series; and restoring an audio signal before encoding through the training model, wherein the training model is derived by connecting the N autoencoders in a cascade form, and training a subsequent autoencoder using a residual signal not learned by a previous autoencoder, wherein a residual signal of the previous autoencoder is an input of the subsequent autoencoder.

6. The audio signal decoding method of claim 5, wherein the training model is derived by iteratively updating autoencoders provided in a cascade form through M update rounds.

7. The audio signal decoding method of claim 6, wherein the training model is a model that an error of an N-th autoencoder is back propagated respectively to a first autoencoder through an (N−1)-th autoencoder.

8. The audio signal decoding method of claim 6, wherein the training model is a model that respective errors of the N autoencoders are back propagated from decoder regions to encoder regions.

9. An audio signal decoder, comprising:

a processor configured to restore a code layer parameter from a bitstream, apply the restored code layer parameter to a training model including N autoencoders provided in a cascade structure such that the N autoencoders are each connected in series, and restore an audio signal before encoding through the training model, wherein the training model is derived by connecting the N autoencoders in a cascade form, and training a subsequent autoencoder using a residual signal not learned by a previous autoencoder.

10. The audio signal decoder of claim 9, wherein the training model is derived by iteratively updating autoencoders provided in a cascade form through M update rounds.

11. The audio signal decoder of claim 10, wherein the training model is a model that an error of an N-th autoencoder is back propagated respectively to a first autoencoder through an (N−1)-th autoencoder.

12. The audio signal decoder of claim 9, wherein the training model is a model that respective errors of the N autoencoders are back propagated from decoder regions to encoder regions.

* * * * *